US 8,639,783 B1

(12) United States Patent
Bakke et al.

(10) Patent No.: US 8,639,783 B1
(45) Date of Patent: Jan. 28, 2014

(54) POLICY BASED CONFIGURATION OF INTERFACES IN A VIRTUAL MACHINE ENVIRONMENT

(75) Inventors: Mark Bakke, Maple Grove, MN (US); David Thompson, Rogers, MN (US); Timothy Kuik, Lino Lakes, MN (US); Saravanakumar Rajendran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 12/584,010

(22) Filed: Aug. 28, 2009

(51) Int. Cl.
*G06F 15/177* (2006.01)
*G06F 13/00* (2006.01)

(52) U.S. Cl.
USPC ............ 709/220; 709/221; 709/222; 710/316

(58) Field of Classification Search
USPC .......................... 709/220, 221, 222; 710/316
See application file for complete search history.

(56) References Cited

U.S. PATENT DOCUMENTS

| | | | |
|---|---|---|---|
| 6,247,057 B1 * | 6/2001 | Barrera, III | 709/229 |
| 6,286,040 B1 * | 9/2001 | Durham et al. | 709/221 |
| 6,363,081 B1 * | 3/2002 | Gase | 370/466 |
| 6,717,914 B1 * | 4/2004 | Hamami | 370/248 |
| 6,760,804 B1 * | 7/2004 | Hunt et al. | 710/313 |
| 7,222,173 B2 * | 5/2007 | Goodman | 709/224 |
| 7,516,211 B1 | 4/2009 | Gourlay et al. | |
| 8,027,354 B1 | 9/2011 | Portolani et al. | |
| 8,102,781 B2 | 1/2012 | Smith | |
| 2003/0014524 A1 | 1/2003 | Tormasov | |
| 2003/0200247 A1 | 10/2003 | Banzhaf et al. | |
| 2005/0108723 A1 * | 5/2005 | Burckart et al. | 719/313 |
| 2005/0182853 A1 | 8/2005 | Lewites et al. | |
| 2005/0232256 A1 * | 10/2005 | White et al. | 370/360 |
| 2006/0230219 A1 * | 10/2006 | Njoku et al. | 710/316 |
| 2006/0230407 A1 | 10/2006 | Rosu et al. | |
| 2007/0028244 A1 | 2/2007 | Landis et al. | |
| 2007/0130295 A1 * | 6/2007 | Rastogi et al. | 709/220 |
| 2009/0276772 A1 | 11/2009 | Garrett et al. | |
| 2009/0292858 A1 * | 11/2009 | Lambeth et al. | 711/6 |
| 2010/0031253 A1 | 2/2010 | Adams et al. | |
| 2010/0054260 A1 | 3/2010 | Pandey et al. | |
| 2010/0214949 A1 | 8/2010 | Smith et al. | |
| 2011/0035494 A1 * | 2/2011 | Pandey et al. | 709/224 |
| 2011/0255538 A1 | 10/2011 | Srinivasan et al. | |

FOREIGN PATENT DOCUMENTS

| | | |
|---|---|---|
| EP | 1953972 | 8/2008 |
| WO | WO 2009146165 | 3/2009 |

* cited by examiner

*Primary Examiner* — Boris Gorney
(74) *Attorney, Agent, or Firm* — Cindy Kaplan (57) ABSTRACT

In one embodiment, an apparatus includes a port profile manager for receiving a port configuration policy and creating a port profile for the port configuration policy. The apparatus further includes a management interface for transmitting the port profile to a management station operable to receive input mapping the port profile to one or more interfaces associated with virtual machines. The port profile manager receives and stores the mapping input at the management station, for use in configuring the interfaces according to the port configuration policy. A method for policy based configuration of interfaces in a virtual machine environment is also disclosed.

20 Claims, 7 Drawing Sheets

POLICY BASED CONFIGURATION OF INTERFACES IN A VIRTUAL MACHINE ENVIRONMENT

BACKGROUND OF THE INVENTION

The present disclosure relates generally to communication networks, and more particularly, to configuring interfaces in a virtual machine environment.

Virtualization is a technology which allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual machines sharing the same physical server hardware.

In a virtual machine environment, virtual switches provide network connectivity between virtual machine interfaces and physical interfaces on the servers. The speed and capacity of today's servers allow for a large number of virtual machines on each server, which results in many virtual interfaces that need to be configured. Also, a single virtual switching domain may encompass many servers, which further increases the number of virtual interfaces requiring configuration.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method for configuring interfaces associated with virtual machines generally comprises receiving a port configuration policy at a network device, creating at the network device, a port profile for the port configuration policy, the port profile configured for application to one or more of the interfaces. The method further includes transmitting the port profile to a management station operable to receive input mapping the port profile to one or more of the interfaces, receiving the mapping, and configuring one or more of the interfaces according to the port configuration policy of the port profile In another embodiment, an apparatus generally comprises a port profile manager for receiving a port configuration policy and creating a port profile for the port configuration policy. The apparatus further includes a management interface for transmitting the port profile to a management station operable to receive input mapping the port profile to one or more interfaces associated with virtual machines. The port profile manager receives and stores the mapping input at the management station for use in configuring the interfaces according to the port configuration policy.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, features relating to technical material that is known in the technical fields related to the invention have not been described in detail.

Virtualization allows one computer to do the job of multiple computers by sharing the resources of a single computer across multiple systems. Software is used to virtualize hardware resources of a computer, including, for example, the CPU, RAM, hard disk, and network controller, to create a virtual machine that can run its own operating system and applications. Multiple virtual machines share hardware resources without interfering with each other so that several operating systems and applications can run at the same time on a single computer. Virtual machines may be used, for example, in a virtual infrastructure to dynamically map physical resources to business needs. Virtualization thus enables the aggregation of multiple servers, storage infrastructure, and networks into shared resources that can be delivered dynamically to applications as needed.

In a virtual environment, virtual switches provide networking connectivity between virtual machine interfaces and physical interfaces on the servers. Each server may include many virtual machines and a single virtual switching domain may encompass many servers, resulting in a large number of virtual ports to be configured.

A network administrator typically configures the virtual switches and the connectivity constraints for the virtual ports on the virtual switch while a system (server) administrator configures the virtual machines and identifies the virtual ports to which the virtual machine interfaces should be connected. If both configuration processes need to be performed via a common interface tool accessing a single device (e.g., management station), each administrator must learn to utilize the interface tool and requires access to the management station.

The embodiments described herein provide a method and apparatus for use in defining configuration policies for a large number of ports in a virtual machine environment. Role based responsibilities are divided between the network administrator and system administrator for the setup of appropriate network connectivity in a virtual environment. As described in detail below, a network administrator configures the virtual switches and the connectivity constraints for the virtual ports on the virtual switch using a virtual switch interface to define port profiles. The port profiles can be applied to any number of virtual ports and can inherit policies from other port profiles. The port profiles are exported (e.g., as port groups) to a virtual machine management device so that the system administrator can choose which policy to use to define the connectivity constraints for the virtual machine interfaces. The system administrator configures the virtual machines and determines which virtual ports to connect to which virtual machine interfaces using the virtual machine management device. This information is then passed to the virtual switch for configuration of the ports.

The embodiments described herein operate in the context of a data communication network including multiple network elements. Some of the elements in a network that employs the system may be network devices such as servers, switches, or routers. The network device may include, for example, a master central processing unit (CPU), interfaces, and a bus. The CPU preferably includes memory and a processor. The network device may be implemented on a general purpose network machine such as described below with respect to FIG. 7.

Figure 1:
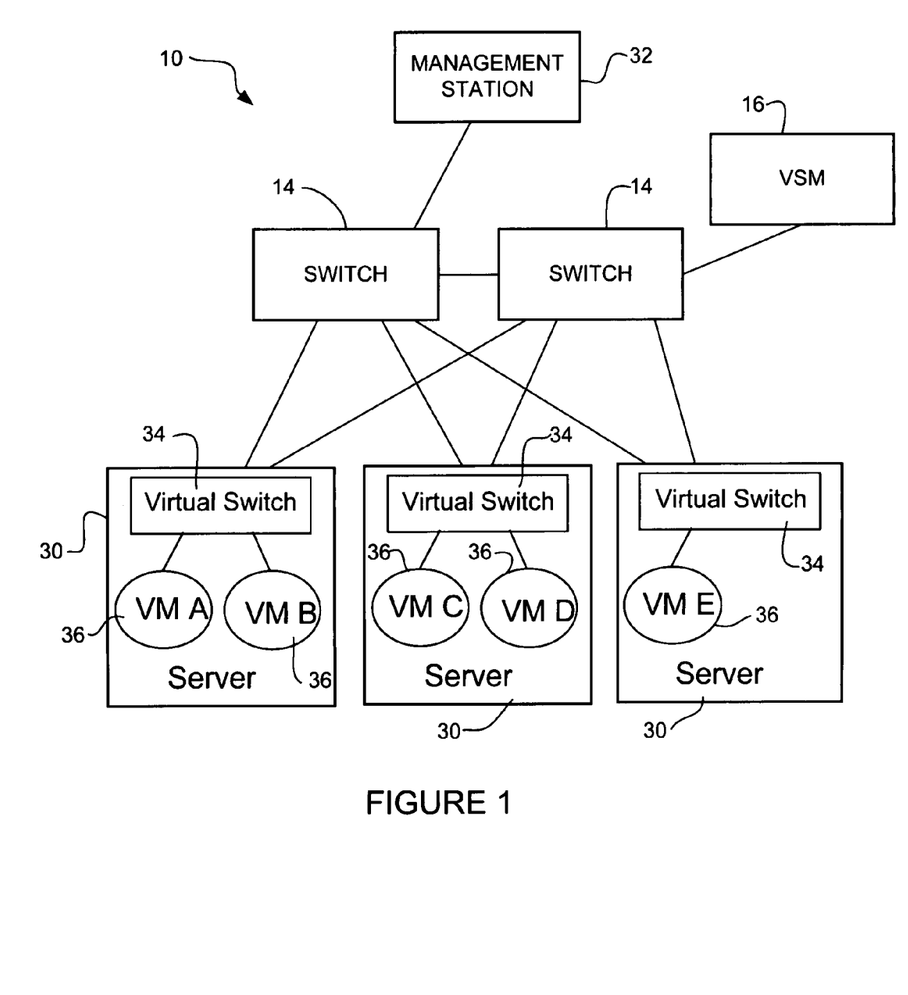
FIG. 1 illustrates an example of a network in which embodiments described herein may be implemented.

Referring now to the drawings, and first to FIG. 1, an example of a network 10 that may implement embodiments described herein is shown. For simplification, only a small number of nodes are shown. The network 10 may be configured for use as a data center or any other type of network. It is to be understood that the network shown in FIG. 1 is only one example, and that the embodiments described herein may be employed in networks having different configurations and types of network devices.

The network 10 shown in FIG. 1 includes physical switches 14 in communication with servers 30 and a management station 32 (e.g., virtualization management platform such as VMWARE Virtual Center management station, available from VMWARE of Palo Alto, Calif.). The servers 30 are also in communication with a Virtual Supervisor Module (VSM) 16. The VSM may be located in a physical appliance (e.g., server) in communication with the servers 30 and management station 32 via physical switches 14, or the VSM may be a virtual appliance (e.g., virtual machine) installed at one of the servers 30 or another server in the network.

Each server 30 includes a virtual switch (referred to herein as a Virtual Ethernet Module (VEM)) 34, and one or more virtual machines (VM A, VM B, VM C, VM D, VM E) 36. The virtual machines 36 share hardware resources without interfering with each other, thus enabling multiple operating systems and applications to execute at the same time on a single computer. A virtual machine monitor such as hypervisor (not shown) dynamically allocates hardware resources to the virtual machines 36. In the example of FIG. 1, VM A, and VM B are located on a first server, VM C and VM D are located on a second server, and VM E is located on a third server, each server being physically separate from the other servers. The virtual machines 36 may each be moved between servers 30 based on traffic patterns, hardware resources, or other criteria.

The VSM 16 is configured to provide control plane functionality for the virtual machines 36. The virtual switch 34 provides switching capability at the server 30 and operates as a data plane associated with the control plane of the VSM 16. The VSM 16 and virtual switch (VEM) 34 operate together to form a distributed virtual switch as viewed by the management station 32.

The virtual machines 36 are in communication with the virtual switch 34 via virtual network interface cards (VNICs) which connect to a virtual Ethernet interface at the virtual switch. The server 30 includes an Ethernet port for each physical network interface card. The Ethernet ports may be aggregated at a port channel. The virtual switches 34 are in communication with the network via the physical Ethernet interfaces. The virtual switch 34 switches traffic between the virtual machines and the physical network interface cards.

A port profile is a container used to define a common set of configuration policies (attributes) for multiple interfaces. The port profiles are associated with port configuration policies defined by the network administrator and applied automatically to a large number of ports as they come online in a virtual environment. The port profiles are 'live' thus, editing an enabled port profile causes configuration changes to propagate to all interfaces using that port profile. As described below, port profiles can inherit configuration from another port profile. The port profiles allow a single policy to be applied across a large number of ports and support static and dynamic mapping to ports, and static mapping to other port profiles forming inheritance chains.

The default state for a port profile is disabled. When a port profile is in the disabled state, it will not be applied to any ports to which it is assigned. When the port profile is in the enabled state, the configuration will be applied to the assigned ports. The port profile state is not inheritable.

The port configuration policies may include, for example, switchport mode, VLAN and PVLAN settings, ACL filter assignments, flow monitors, auto port-channel creation (adds port as a member of a port channel interface), QoS service policy, port security, NetFlow collection, ACL redirect, rate limiting, remote port mirror, or any other configuration attribute that may be applied to a port on a network switch.

Configuration commands for port profiles may include, for example, port profile creation/deletion, virtualization management platform (VMWARE) port group (specifies port group to be created at the management station), port profile state (enabled/disabled), port profile capability (marks a port profile to be used for Ethernet (physical/uplink) interfaces), inherit port profile (sets up the inheritance between a parent port profile and a child port profile), port management configuration (port admin status, switchport mode), VLAN and PVLAN configuration, port channel configuration, override port profile configuration, NetFlow configuration, ACL configuration, QoS configuration, port security configuration, and show commands.

It is to be understood that the configuration policies and commands described herein are only examples and different configuration policies and commands may be used without departing from the scope of the invention. The example configuration commands and attributes described herein are related to VMWARE. Other configuration commands and attributes associated with other hypervisors or virtualization systems may also be used.

As described in detail below, the port profiles are defined and created at the VSM 16 and transmitted to the management station 32. In one embodiment, the port profiles are transmitted to the management station 32 as port groups for consistency with a management station interface. The term "port group" as used herein refers to any format associated with a specified management station. In one example, port group refers to a VMWARE format for use with VMWARE Virtual Center management station.

The port profile may be assigned a name and a port profile ID (PPID). The port group may also be assigned a name and an ID. There may be multiple aliases referring to the same port profile. The VSM stores a mapping of the port profile to port group and other aliases. The term 'port profile' as used herein may refer to a PPID, port group, alias or any other identifier for a port configuration policy. A single identifier of a configuration policy may be used at both the VSM 16 and management station 32 or different identifiers may be used.

Figure 2:
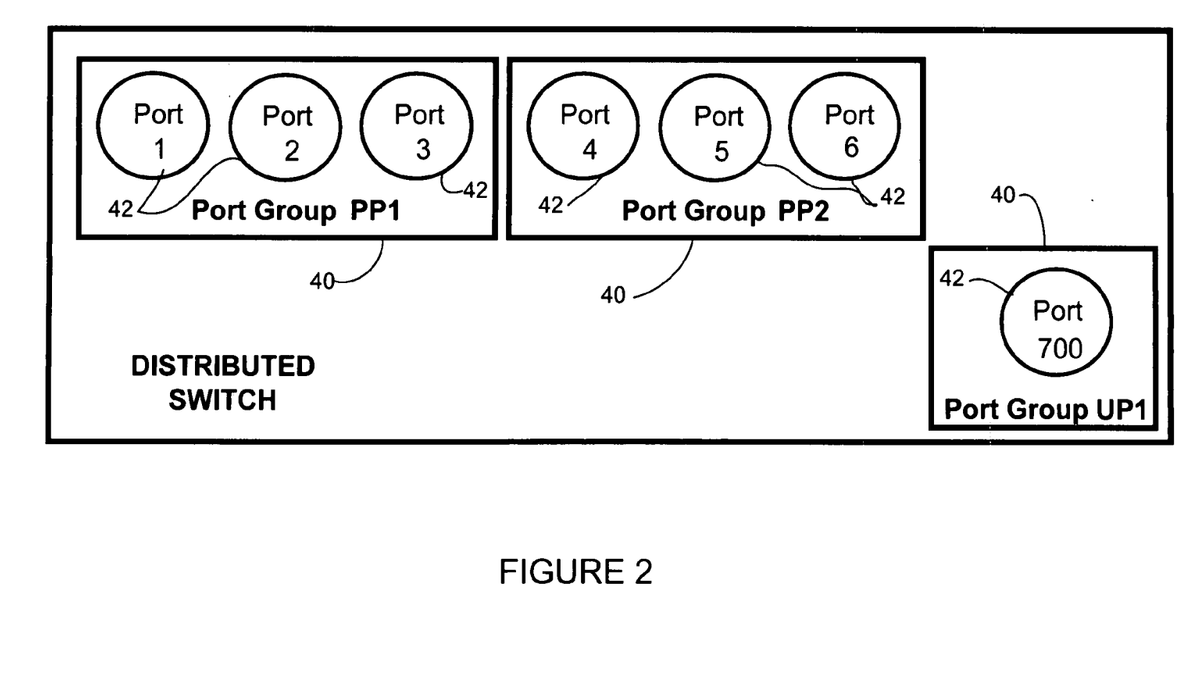
FIG. 2 illustrates port groups defined for a virtual supervisor module of the network of FIG. 1.
Figure 3:
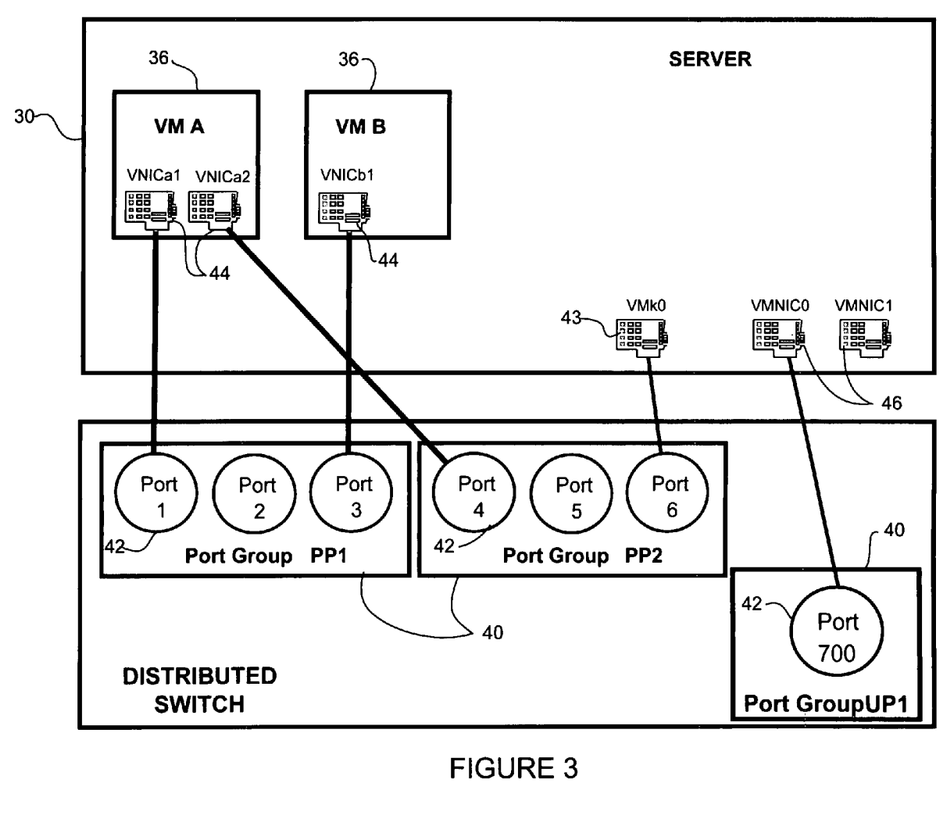
FIG. 3 illustrates connection of virtual machine interfaces and physical interfaces to the port groups of FIG. 2.
Figure 4:
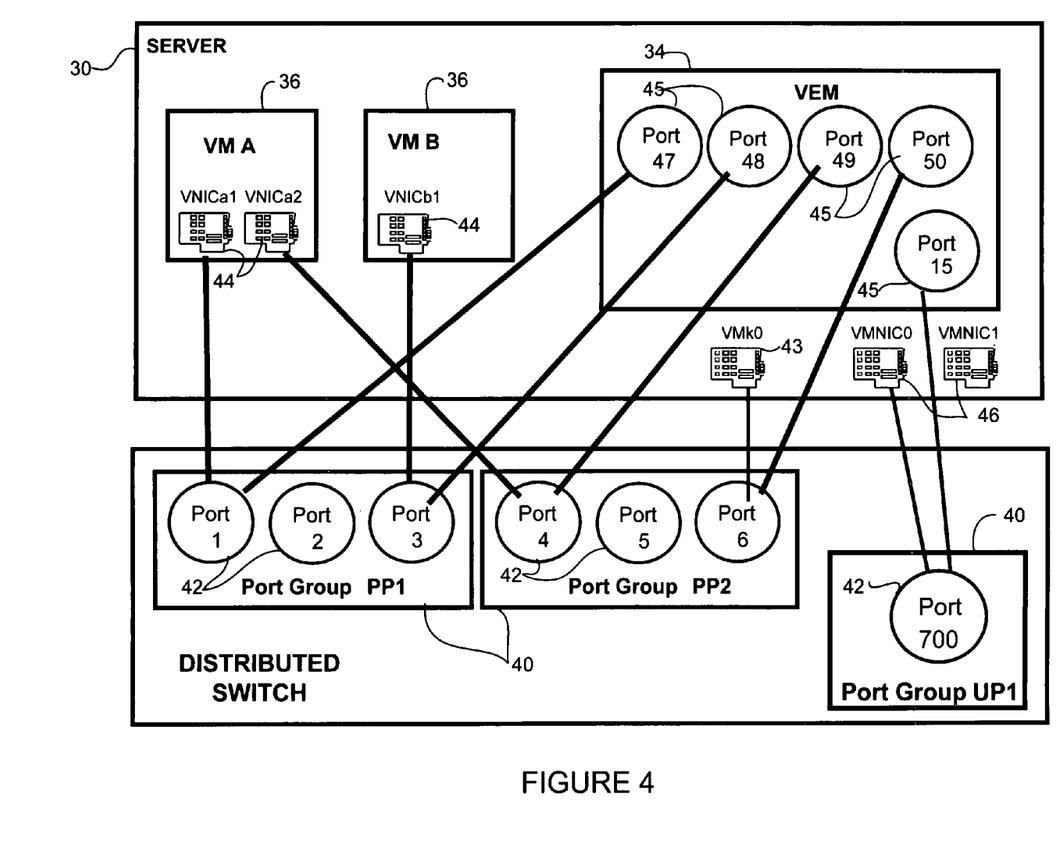
FIG. 4 illustrates association of virtual switch ports with the port groups.

FIGS. 2-4 illustrate creation of a port profile/port group at the distributed switch and association of the port groups with the virtual machine interfaces, physical interfaces, and virtual switch ports.

FIG. 2 illustrates an example of port profiles defined by a user (e.g., network administrator). The port profiles may be defined using a VSM CLI (command-line interface), for example. In one embodiment, when a port profile is created, it is assigned a PPID (e.g., unique 32 bit number) by a port profile manager (described below). When the port profile is created on the VSM 16, the VSM also creates a port group (policy object) representing the port profile and pushes the port group to the management station. In the example shown in FIG. 2, three port groups 40 are created. Port groups PP1 and PP2 represent non-uplink port profiles and port group UP1 represents an uplink port profile. As shown in the example of FIG. 2, each port group 40 includes a plurality of ports 42 for connection of the port group to one or more interfaces.

Once the port profiles/port groups are defined at the VSM 16, the port groups are transmitted to the management station 32 (FIG. 1). The system administrator chooses which configuration policy to use and attaches a port group to a virtual machine interface (FIG. 3). In the example of FIG. 3, virtual machine A includes two virtual network interface cards (VNICa1 and VNICa2) 44 and virtual machine B includes one virtual network interface card (VNICb1) 44. VNICa1 is attached to port group PP1, VNICa2 is attached to port group PP2, and VNICb1 is attached to port group PP1. The physical interfaces (VMNIC0, VMNIC1) of the server 30 are identified by reference numeral 46 in FIG. 3. VMk0 43 is a virtual interface used by the hypervisor kernel to get network access for its internal stack. One of the physical adapters (Ethernet ports) (VMNIC0) 46 of the server 30 is connected to the uplink port group UP1 and another physical adapter VMk0 is connected to port group PP2.

FIG. 4 illustrates connection of the virtual switch's virtual Ethernet ports (e.g., local ports) 45 to the appropriate port groups 40. Ports 47 and 48 are associated with port group PP1, ports 49 and 50 are associated with port group PP2, and port 15 is associated with port group UP1.

Figure 5:
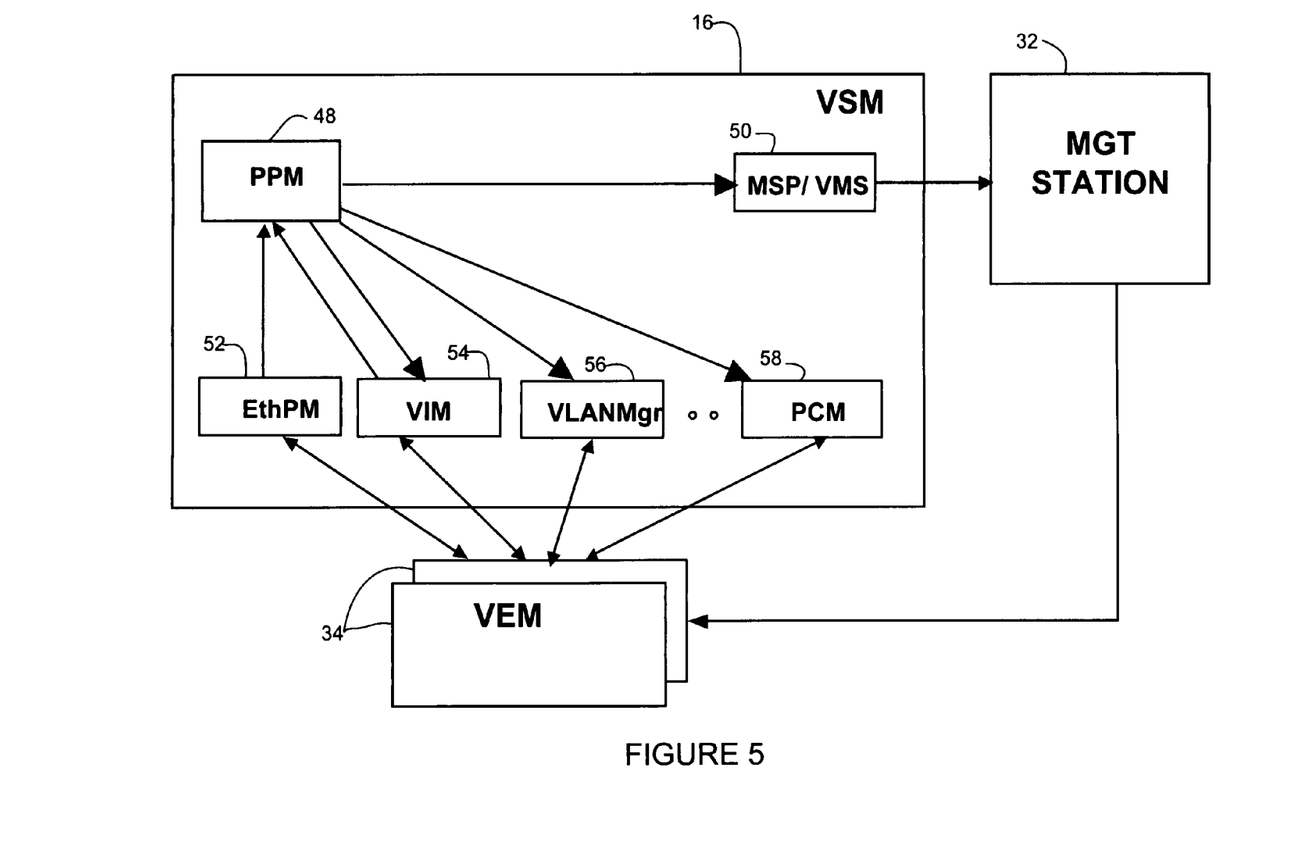
FIG. 5 is a block diagram illustrating details of the virtual supervisor module, in accordance with one embodiment.

FIG. 5 is a block diagram illustrating components of the VSM 16 and interaction with the VEM (virtual switch) 34 and management station 32, in accordance with one embodiment. The VSM 16 includes a port profile manager (PPM) 48 for management of the port profiles at the VSM. The VSM 16 also includes a Management Server Proxy (MSP)/VMWARE Management Server (VMS) (management interface) 50, Ethernet Port Manger (EthPM) 52, Virtual Interface Manger (VIM) 54, VLAN Manager (VLANMgr) 56, and Port Channel Manager (PCM) 58. The interaction of these components is described below with respect to the flowchart of FIG. 6.

Figure 6:
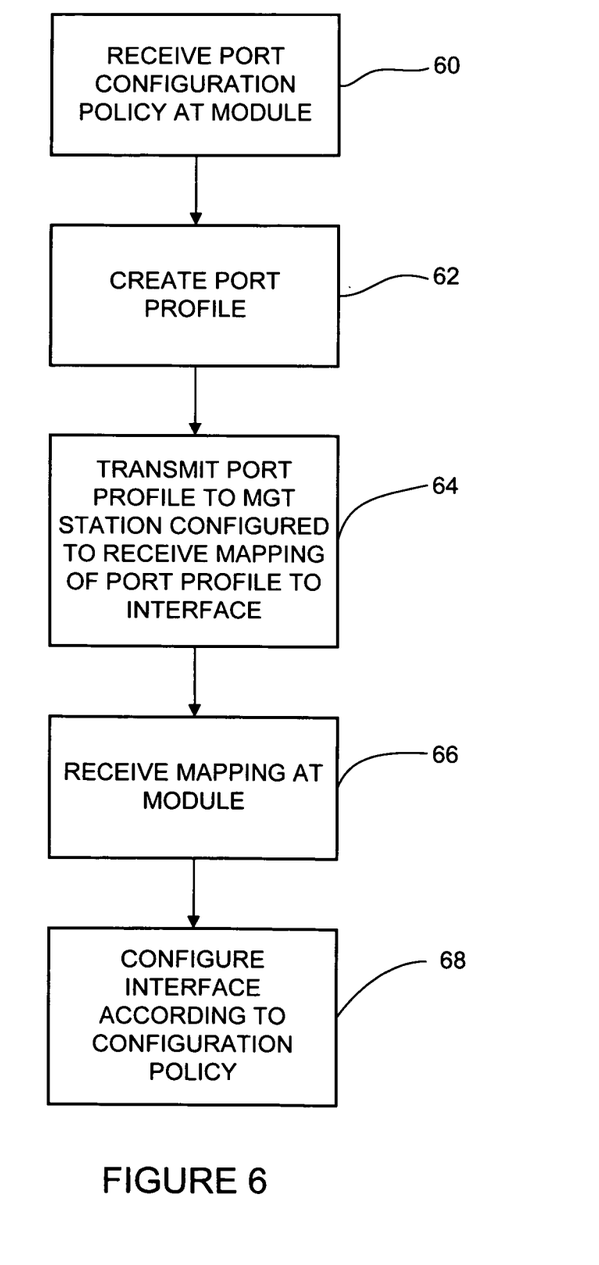
FIG. 6 is a flowchart illustrating a process for creating port profiles at the virtual supervisor module and configuring interfaces based on a received association between the port profiles and the interfaces.

FIG. 6 is a flowchart illustrating a process for creating port profiles and configuring interfaces in a virtual machine environment. At step 60 the VSM 16 receives a port configuration policy from a first user (e.g., network administrator). The port profile manager 48 at the VSM 16 creates a port profile for the port configuration policy (step 62). As previously discussed, the port profile is configured for application to one or more of the interfaces. In one embodiment, a port profile instance is created at the PPM 48 and a PPID is allocated to the instance (FIG. 5). The PPM interacts with the VMS 50 to create the port group. The VMS component (management interface) 50 manages the connection with the management station 32. The port profile (port group) is transmitted to management station 32 at step 64 (FIG. 6). As previously discussed, the port profile may be converted to a port group before being transmitted to the management station 32. The management station receives input mapping the port profile (port group) to one or more of the interfaces from a second user (e.g., system administrator). The management station 32 notifies the virtual switch 34 of the mapping and the virtual switch notifies the VSM 16 of the mapping (step 66) (FIGS. 5 and 6). In one embodiment, the PPM 48 receives the notification and sends an interface configuration to the port channel manager 58. The port channel manager merges the configuration with its own configuration and sends the merged configuration to virtual switch 34, which then programs the interfaces. As the virtual machines 36 are activated, the virtual switch 34 relays the policy object assigned to the virtual machine VNICs 44 to the VSM 16, which then determines the proper port profile and configures the ports that the virtual machine is using according to the configuration policies defined by those profiles (step 68).

The network administrator may manually assign a port profile to an interface without pushing the port profile/port group to the management station 32. If a port profile is manually assigned to an interface, the PPM 48 notifies clients of the new binding (FIG. 5). The VLAN manager 56 receives the notification and performs a merge with its own configuration for the interface. The configuration is pushed to the virtual switch 34 to properly configure the port. The network administrator may also override policies applied by the system administrator at the management station 32.

As VMNIC interfaces on the servers are added, the EthPM 52 adds Ethernet interfaces to the VSM 16 to represent them. As these interfaces are created, the PPM 48 automatically binds them to the appropriate port profile when the VIM 54 informs the PPM of the Ethernet attach event.

When the configuration of a port profile which is bound to at least one interface is changed, the PPM 48 performs a handshake with the affected components. For example, the PPM 48 communicates with VLAN Mgr 56 when access VLANs change. The VLAN Mgr 56 can choose to accept the proposed configuration change and then perform a merge with its own configuration for the interface.

As described above, a port profile may inherit characteristics configured on another profile. If a port profile B inherits from a port profile A, for example; A is referred to as a parent port profile, B is referred to as a child port profile, all configuration attributes specified in A become part of B, and B can override configuration (specify alternate values) for any attribute inherited from A. Inheritance may be used to implement reuse of a configuration from an existing port profile or customize an existing port profile for a specific need. For example, a parent port profile may be created to define a VLAN and child port profiles created to define different QoS levels within that same VLAN.

A chain of inheritance may also be formed. For example, a parent port profile A may have a child port profile B and a child port profile C, while C has a child port profile D and a child port profile E. Each port profile preferably has only one unique parent port profile. Any number of port profiles may inherit from a parent port profile. In one embodiment, inheritance hierarchy can extend, for example, four levels deep (excluding the root profile). Inheritance hierarchy can also extend more or less than four levels deep. The system is preferably configured so that loops in an inheritance chain are detected and prevented. Each port profile along the chain can override the configured values inherited from the parent. For example, any of the inherited attributes can be overridden by explicit configuration within the context of the child port profile. Interface configurations (e.g., VLAN, port mode, etc.) are inherited, while port profile attributes (e.g., description, state, VMWARE port-group) are not inherited.

Figure 7:
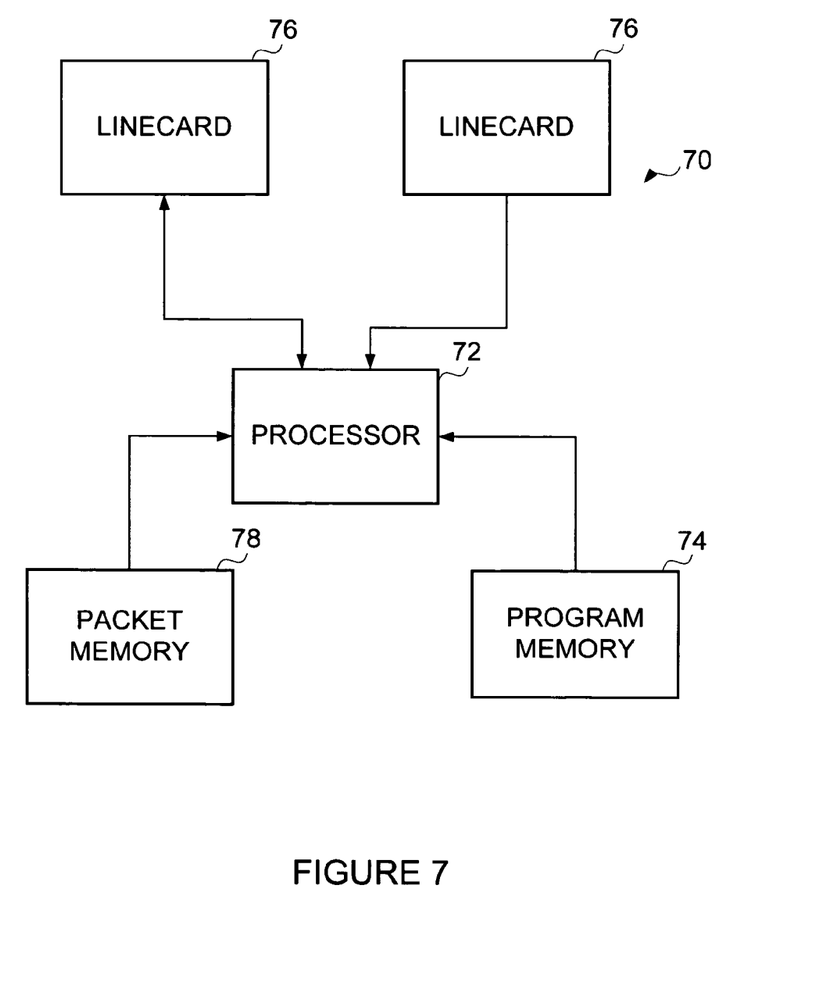
FIG. 7 depicts an example of a network device useful in implementing embodiments described herein.

FIG. 7 depicts a network device 70 that may be used to implement embodiments described herein. Network device 70 is configured to implement all of the network protocols and extensions thereof described above. In one embodiment, network device 70 is a programmable machine that may be implemented in hardware, software, or any combination thereof. Logic may be encoded in one or more tangible media for execution by a processor. For example, processor 72 may execute codes stored in a program memory 74. Program memory 74 is one example of a computer-readable medium. Program memory 74 can be a volatile memory. Another form of computer-readable medium storing the same codes is a type of non-volatile storage such as floppy disks, CD-ROMs, DVD-ROMs, hard disks, flash memory, etc.

Network device 70 interfaces with physical media via a plurality of linecards 76. Linecards 76 may incorporate Ethernet interfaces, DSL interfaces, Gigabit Ethernet interfaces, 10-Gigabit Ethernet interfaces, SONET interfaces, etc. As packets are received, processed, and forwarded by network device 70, they may be stored in a packet memory 78. To implement functionality according to the system, linecards 76 may incorporate processing and memory resources similar to those discussed above in connection with the network device as a whole. It is to be understood that the network device 70 shown in FIG. 7 and described above is only one example and that different configurations of network devices may be used.

As can be observed from the foregoing, the embodiments described herein provide numerous advantages. For example, network administrators can use the tools they are familiar with (e.g., Cisco switch CLI) instead of having to learn and require access to the management station provided by virtualization companies for the management of the virtual machines. The embodiments simplify system maintenance in that interfaces that share common characteristics can have those definitions stored in a single location rather than having them replicated for each interface.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   receiving a port configuration policy at a distributed virtual switch, the distributed virtual switch in communication with a management station and a plurality of servers each comprising at least one virtual machine comprising at least one virtual interface;
   creating at the distributed virtual switch, a port profile for said port configuration policy, said port profile defining a common set of configuration policies for automatic application to one or more of said virtual interfaces as said virtual interfaces come online in a virtual environment;
   transmitting from the distributed virtual switch, said port profile to a management station operable to receive input mapping said port profile to one or more of said virtual interfaces;
   receiving at the distributed virtual switch, said mapping from the management station;
   configuring said one or more virtual interfaces according to said port configuration policy of said port profile;
   wherein receiving said port configuration policy comprises receiving input from a first user and wherein said mapping input at the management station comprises input received at the management station from a second user, the management station independent from the distributed virtual switch, and wherein at least two of said virtual interfaces at the same said virtual machine are mapped to different port profiles.

2. The method of claim 1 wherein transmitting said port profile to the management station comprises converting said port profile to a port group and transmitting said port group, wherein said mapping maps said port group to one or more of said interfaces.

3. The method of claim 1 further comprising associating said port profile with a parent port profile so that said port profile inherits port configuration policies associated with said parent port profile.

4. The method of claim 1 wherein the distributed virtual machine is located at a server and comprises a virtual appliance.

5. The method of claim 1 further comprising receiving a change to said port profile, wherein said change propagates to all of said interfaces associated with said port profile.

6. The method of claim 1 wherein receiving said mapping comprises receiving said mapping from a virtual switch in communication with the virtual machine upon activation of the virtual machine.

7. The method of claim 1 wherein receiving said mapping comprises receiving said mapping when the virtual machine is moved to a different server.

8. The method of claim 1 wherein the port configuration policy is defined by a first user and applied automatically to a plurality of said interfaces as said interfaces come online in a virtual environment, and wherein said mapping input comprises input received from a second user.

9. The method of claim 1 wherein receiving input from said first user comprises receiving input from a network administrator and said input received at the management station is from a system administrator.

10. An apparatus comprising:
    a processor for receiving a port configuration policy at a distributed virtual switch, the distributed virtual switch in communication with a management station and a plurality of servers each comprising at least one virtual machine comprising at least one virtual interface, creating a port profile for said port configuration policy, and transmitting said port profile to a management station operable to receive input mapping said port profile to one or more of said virtual interfaces, transmitting said port profile to a management station operable to receive input mapping said port profile to one or more of said virtual interfaces, and receiving said mapping from the management station; and
    memory for storing said mapping for use in configuring said one or more virtual interfaces according to said port configuration policy;
    wherein said port profile defines a common set of configuration policies, said port configuration policy comprises attributes input from a first user to the apparatus and said mapping input comprises input received at the management station from a second user, the management station independent from the network device, and wherein at least two of said virtual interfaces at the same said virtual machine are mapped to different port profiles.

11. The apparatus of claim 10 wherein said port profile is converted to a port group before it is transmitted to the management station and wherein the management station receives input mapping said port group to said one or more interfaces.

12. The apparatus of claim 10 wherein the processor is configured to associate said port profile with a parent port profile so that said port profile inherits port configuration policies associated with said parent port profile.

13. The apparatus of claim 10 wherein the apparatus is a virtual appliance installed at a server.

14. The apparatus of claim 10 wherein at least one of said interfaces is a virtual interface of one of the virtual machines and at least one of said interfaces is a physical interface at a server comprising the virtual machines.

15. The apparatus of claim 10 wherein the mapping is received from a virtual switch upon activation of the virtual machine.

16. The apparatus of claim 10 wherein said port profile is configured as disabled in which said configuration policy is not applied to said interfaces, or enabled in which said configuration policy is applied to said interfaces.

17. The apparatus of claim 10 wherein the processor is configured to receive a port configuration policy adding a port to a port channel.

18. The apparatus of claim 10 wherein said port configuration policy comprises a configuration attribute for application to a port on a network switch.

19. Non-transitory storage media with encoded logic for execution and when executed operable to:
receive a port configuration policy comprising attributes for one or more interfaces at a distributed virtual switch operable for communication with a management station and a plurality of servers each comprising at least one virtual machine comprising at least one virtual interface, each of said interfaces associated with a virtual machine at a network device;
create a port profile for said port configuration policy, said port profile defining a common set of configuration policies for application to one or more of said virtual interfaces associated with a virtual machine;
transmit said port profile to a management station operable to receive input mapping said port profile to one or more of said virtual interfaces;
receive at the network device, said mapping input at the management station; and
configure said one or more virtual interfaces according to said port configuration policy of said port profile;
wherein said port configuration policy is received as input at the network device and said mapping input at the management station comprises input received at the management station, the management station independent from the network device, and wherein at least two of said virtual interfaces at the same said virtual machine are mapped to different port profiles.

20. The logic of claim 19 wherein the logic is operable to associate said port profile with a parent port profile so that said port profile inherits port configuration policies associated with said parent port profile.

* * * * *